US010100748B2

(12) United States Patent
Kawai et al.

(10) Patent No.: US 10,100,748 B2
(45) Date of Patent: Oct. 16, 2018

(54) DUAL FUEL GAS TURBINE THRUST AND POWER CONTROL

(71) Applicant: THE BOEING COMPANY, Chicago, IL (US)

(72) Inventors: Ronald T. Kawai, Rancho Palos Verdes, CA (US); Michael K. Kisska, Long Beach, CA (US)

(73) Assignee: THE BOEING COMPANY, Chicago, IL (US)

( * ) Notice: Subject to any disclaimer, the term of this patent is extended or adjusted under 35 U.S.C. 154(b) by 167 days.

(21) Appl. No.: 14/486,785

(22) Filed: Sep. 15, 2014

(65) Prior Publication Data
US 2016/0076461 A1 Mar. 17, 2016

(51) Int. Cl.
F02C 1/00 (2006.01)
F02C 9/40 (2006.01)
F23R 3/36 (2006.01)
B64D 37/04 (2006.01)
B64D 37/30 (2006.01)

(52) U.S. Cl.
CPC ............ *F02C 9/40* (2013.01); *B64D 37/04* (2013.01); *B64D 37/30* (2013.01); *F23R 3/36* (2013.01)

(58) Field of Classification Search
CPC .... F02C 9/40; F02C 3/20; F02C 9/263; F02C 9/32; F02C 9/44; F02C 9/28; F02C 9/26; B64D 37/04; F23R 3/36; F23R 3/28; F23D 17/002
See application file for complete search history.

(56) References Cited

U.S. PATENT DOCUMENTS

| 4,201,045 | A | * | 5/1980 | Vani | F02C 9/28 60/39.091 |
| 4,300,502 | A | * | 11/1981 | Driggers | F02M 37/0023 123/389 |
| 4,437,303 | A | * | 3/1984 | Cantwell | F02C 9/28 60/243 |
| 5,121,598 | A | * | 6/1992 | Butler | F02C 7/14 60/39.08 |
| 5,285,634 | A | * | 2/1994 | Hoff | F02C 9/28 60/39.281 |

(Continued)

OTHER PUBLICATIONS

Rokke, Petter Egil et al., Technology Update on Gas Turbine Dual Fuel, Dry Low Emission Combustion Systems, Proceedings of ASME Turbo Expo, Jun. 2003, pp. 1-11, American Society of Mechanical Engineers, New York City, United States.

(Continued)

*Primary Examiner* — Pascal M Bui Pho
*Assistant Examiner* — Edwin Kang
(74) *Attorney, Agent, or Firm* — Patterson + Sheridan, LLP

(57) ABSTRACT

An aircraft, controller, and method for simultaneously using a liquid fuel and a gaseous fuel. The use of natural gas and other similar fuels in gas turbines engines can enable an aircraft to operate less expensively. However, aircraft often use liquid fuels en route to the gas turbine engine burners for secondary purposes, such as oil cooling and hydraulic pressure. The aircraft, controllers, and methods described herein feed a minimal quantity of liquid fuel to an engine to satisfy the secondary purposes while simultaneously feeding a quantity of gaseous fuel to the engine to satisfy a thrust command for the engine.

17 Claims, 4 Drawing Sheets

(56) References Cited

U.S. PATENT DOCUMENTS

| | | | | |
|---|---|---|---|---|
| 6,789,000 | B1* | 9/2004 | Munson, Jr. | F01D 19/00 361/51 |
| 2007/0084211 | A1* | 4/2007 | Bowman | F02C 9/20 60/772 |
| 2009/0315729 | A1* | 12/2009 | Inhoffer | B64F 1/28 340/632 |
| 2010/0107603 | A1* | 5/2010 | Smith | F02C 7/14 60/267 |
| 2010/0280731 | A1* | 11/2010 | Snider | F02C 9/26 701/100 |
| 2012/0095667 | A1* | 4/2012 | Hase | F02D 41/3082 701/103 |
| 2013/0097991 | A1* | 4/2013 | Zhang | F23K 5/06 60/39.59 |
| 2013/0186059 | A1* | 7/2013 | Epstein | F02C 3/22 60/205 |
| 2013/0192246 | A1* | 8/2013 | Kamath | F02C 7/228 60/776 |
| 2015/0027412 | A1* | 1/2015 | Henson | F02C 7/236 123/457 |

OTHER PUBLICATIONS

Gibbs, Jonathan et al., A Natural Gas Supplementary Fuel System to Improve Air Quality and Energy Security, 50th AIAA Aerospace Science Meeting Including the New Horizons Forum and Aerospace Exposition, Jan. 2012, pp. 1-20, The American Institute of Aeronautics and Astronautics, Inc., Reston, United States.

LNG-fuelled catamaran pushes frontiers in ferry powering, The Motorship: insight for marine technology professionals, Jan. 27, 2014, <http://www.motorship.com/news101/ships-and-shipyards/lng-fuelled-catamaran-pushes-frontiers-in-ferry-powering>.

* cited by examiner

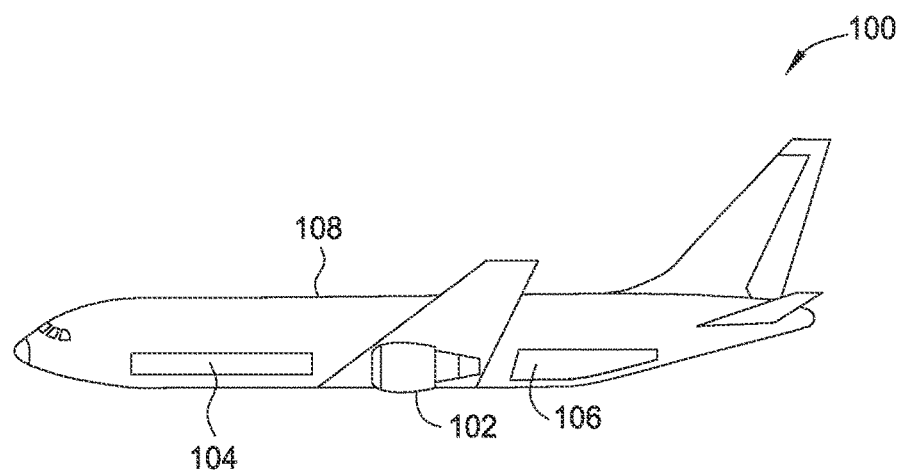
FIG. 1
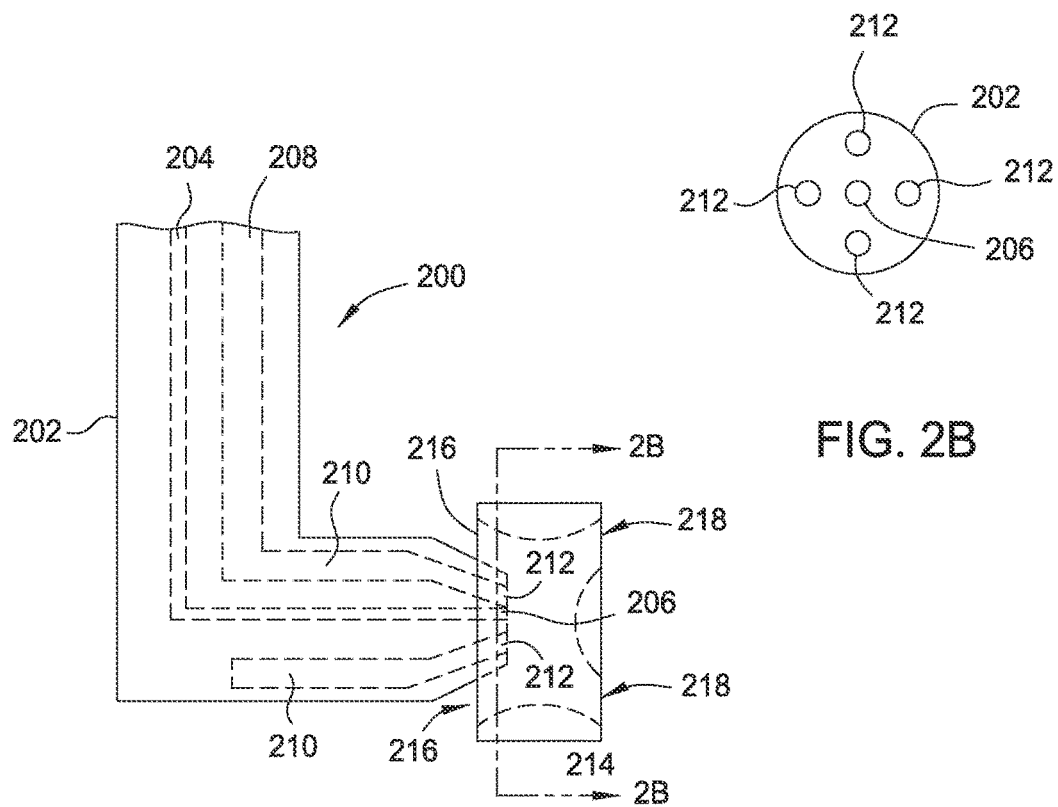
FIG. 2B
FIG. 2A

DUAL FUEL GAS TURBINE THRUST AND POWER CONTROL

BACKGROUND

Field of the Invention

The present invention relates to providing fuel to a gas turbine engine, and more specifically, to providing two fuels to a gas turbine engine simultaneously.

SUMMARY

According to various embodiments, an aircraft can include a first fuel storage container that stores a liquid fuel and a second fuel storage container that stores a gaseous fuel. The aircraft can include at least one gas turbine engine that has a fuel nozzles configured to inject the liquid fuel and the gaseous fuel into a burner of the gas turbine engine. The aircraft can include a controller configured to simultaneously meter flow of both the liquid fuel and the gaseous fuel to the fuel nozzles from the first fuel storage container and the second fuel storage container. The controller can be configured to meter the flow of the liquid fuel to satisfy an operating limit of the gas turbine engine.

According to various embodiments, a fuel flow controller can include a first input configured to receive a throttle command, a second input configured to receive a dual fuel indication, and a third input configured to receive an engine sensor signal from an engine. The controller can also include a first output configured to output a liquid fuel flow signal to a liquid fuel metering valve and a second output configured to output a gaseous fuel flow signal to a gaseous fuel metering valve. The controller can also include computer logic configured to achieve a concurrent gaseous fuel flow and liquid fuel flow to the engine by outputting a liquid fuel flow signal based on at least a received throttle command and a received engine sensor signal and by outputting a gaseous fuel flow signal based on at least a received dual fuel indication and received throttle command.

According to various embodiments, a method for operating a gas turbine engine using a liquid fuel and a gaseous fuel simultaneously can include measuring an engine parameter that depends on a fuel flow of the liquid fuel. The method can also include receiving an engine thrust request. The method can also include metering fuel flow of the liquid fuel to satisfy a predetermined constraint on the measured engine parameter and simultaneously metering fuel flow of the gaseous fuel to satisfy the received engine thrust request.

BRIEF DESCRIPTION OF THE SEVERAL VIEWS OF THE DRAWINGS

FIG. 1 is a depiction of an airplane with two fuel tanks, a first fuel tank for a first fuel and a second fuel tank for a second fuel;

FIG. 2A is a side view of a dual-fuel fuel nozzle for use in a gas turbine engine;

FIG. 2B is a cross-sectional view of the dual-fuel fuel nozzle of FIG. 2A;

DETAILED DESCRIPTION

Figures 3A, 3B, 3C:
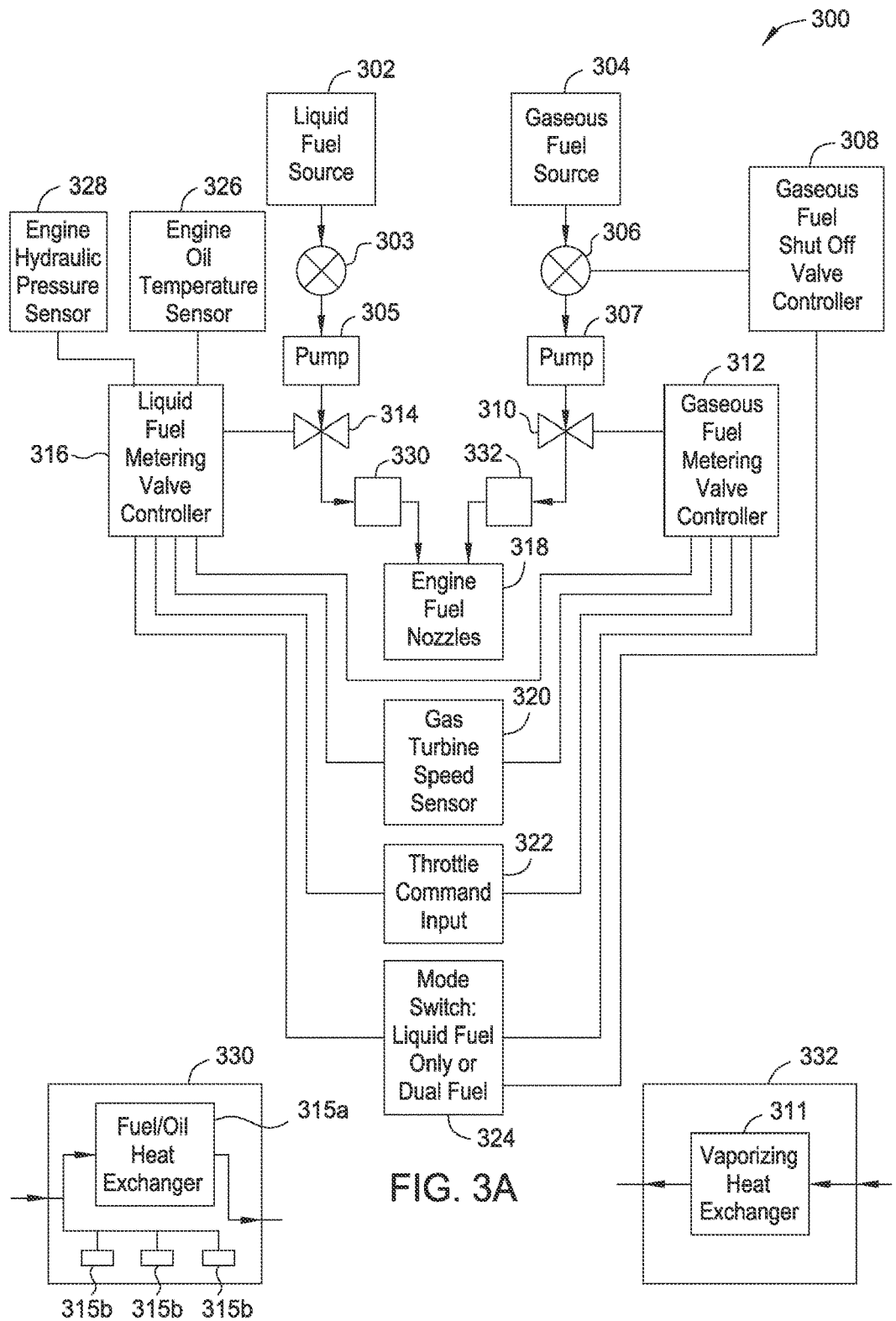
FIG. 3A is a block diagram of a dual fuel system for use in an aircraft
FIG. 3B is a block diagram of ancillary systems in communication with the liquid fuel source.
FIG. 3C is a block diagram of an ancillary system in communication with the gaseous fuel source that includes a vaporizing heat exchanger.

An aircraft typically operates on a single fuel source. For example, an aircraft powered by gas turbine engines may use jet A fuel, JP-8 fuel, diesel, or gasoline as fuel. In addition to using such fuels for combustion in the engine, the fuels may be used for ancillary purposes such as oil cooling or providing hydraulic pressure in the engine. For example, the fuel may pass through an oil cooler and/or through a hydraulic system before going to fuel nozzles in the gas turbine engine. Less expensive fuels (e.g., cryogenic fuels such as liquefied natural gas and liquid methane or non-cryogenic fuels such as natural gas, methane, butane, propane, or heptanes) may provide better operating costs, but may not be compatible with the ancillary systems that also use fuel. For example, such fuels may not be able to provide oil cooling or hydraulic pressure.

Referring to FIG. 1, an embodiment of an aircraft 100 described herein can include a first fuel storage container 104 (e.g., a fuel tank) that stores a liquid fuel, such as jet A, JP-8, diesel, or gasoline. As used herein, the term "liquid fuel" refers to a fuel that is injected into a burner of a gas turbine engine in a liquid state. The liquid fuel can be distributed amongst several fuel storage containers 104 distributed about the aircraft (e.g., in the wings and fuselage 108). The aircraft 100 also includes a second fuel storage container 106 that stores a gaseous fuel (e.g., as a cryogenic fuel such as liquefied natural gas, liquid methane, and liquid hydrogen or as a non-cryogenic fuel such as compressed natural gas, compressed methane, butane, propane, or heptanes). As used herein, the term "gaseous fuel" refers to a fuel that is injected into a burner of a gas turbine engine in a gaseous state. Such gaseous fuel may be stored in the second fuel storage container 106 in a gaseous state or in a liquid state, for example. The gaseous fuel can be distributed amongst several fuel storage containers 106 distributed about the aircraft. The aircraft can include one or more gas turbine engines. As described in greater detail below, embodiments of gas turbine engines 102 described herein for the aircraft can simultaneously operate on liquid fuel received from the first fuel storage container 104 and gaseous fuel received from the second fuel storage container 106. The engines gas turbine can consume sufficient quantities of the liquid fuel to satisfy the ancillary systems, such as oil cooling and/or engine hydraulic pressure while simultaneously consuming sufficient quantities of the gaseous fuel to satisfy the thrust command from the aircraft 100. Put differently, the aircraft 100 could be commanding a certain level of engine thrust, and the combined liquid fuel and gaseous fuel injected into the burner of the gas turbine engine 102 provides the commanded level of thrust.

In various embodiments, the second fuel storage container 106 and other systems, described below, for supplying a gaseous fuel to the gas turbine engines 102 can be retrofit to an existing aircraft. For example, the second fuel storage container 106 may be arranged in a cargo area of the aircraft 100. For example, tanker aircraft used by the military (e.g., the KC-10 or KC-135) may include an unutilized cargo area or other interior space in which the second fuel storage container 106 may be arranged. As another example, the second fuel storage container 106 may be arranged as a conformal tank on an exterior surface of the aircraft 100. The second fuel storage container 106 may require insulation and/or pressurization capability to store the gaseous fuel.

Referring now to FIGS. 2A and 2B, a dual-fuel fuel nozzle 200 can include a body 202 with a liquid fuel passage 204 that terminates in a liquid fuel orifice 206. The body 202 can also include a gaseous fuel passage 208 that leads to the manifold 210. The manifold 210 terminates in a plurality of gaseous fuel orifices 212. The gaseous fuel orifices 212 can surround the liquid fuel orifice 206. FIG. 2B illustrates four gaseous fuel orifices 212 arranged around the liquid fuel orifice 206. In various embodiments, different numbers of gaseous fuel orifices 212 can be arranged relative to different numbers of liquid fuel orifices 206. The dual-fuel fuel nozzle 200 can also include a mixing body 214 that includes an inlet 216 and an outlet 218. Compressed air from a compressor of the gas turbine engine can enter the mixing body 214 through the inlet 216 to mix with the liquid fuel from the liquid fuel orifice 206 and with the gaseous fuel from the gaseous fuel orifices 212. The mixture of air and fuel can exit the mixing body 214 through the outlet 218 to be burned in the burner of the gas turbine engine.

In various embodiments, a gas turbine engine could include a plurality of single-fuel fuel nozzles, wherein some of the single-fuel fuel nozzles output liquid fuel into the burner of the gas turbine engine and the remainder of the single-fuel fuel nozzles output gaseous fuel into the burner of the gas turbine engine.

FIGS. 3A, 3B, and 3C illustrate a block diagram of a system 300 for simultaneously providing two fuels to a gas turbine engine. The system 300 can include a liquid fuel source 302 and a gaseous fuel source 304. The liquid fuel from the liquid fuel source 302 can pass through a shutoff valve 303, a pump 305 to increase pressure, and a liquid fuel metering valve 314 in or in line with conduits to reach the engine fuel nozzles 318 of a gas turbine engine. The liquid fuel can also pass through one or more ancillary systems 330 (see FIG. 3B) for the aircraft or for the engine before reaching the engine fuel nozzles 318. For example, the liquid fuel may pass to or through a fuel/oil cooler 315a that cools oil for the gas turbine engine. As another example, the pressurized liquid fuel may pass to hydraulic actuators 315b for the gas turbine engine. The liquid fuel metering valve 314 can vary between a fully-closed position and a fully-open position (and partially-open positions therebetween). The liquid fuel metering valve 314 can be operated to meter or set the flow rate of liquid fuel that reaches the engine fuel nozzles 318 and the ancillary systems. The liquid fuel metering valve 314 can be connected to a liquid fuel metering valve controller 316 that controls the position of the liquid fuel metering valve 314. The conduits can be any type of tubing, pipes, or the like for transporting the liquid fuel. The conduits are indicated in FIGS. 3A and 3B by the arrows connecting the liquid fuel source 302, the engine fuel nozzles 318, and the various components therebetween.

In various embodiments, the gaseous fuel from the gaseous fuel source 304 can pass through a shut off valve 306 and a gaseous fuel metering valve 310 in or in line with conduits to reach the engine fuel nozzles 318. In instances in which the gaseous fuel is a cryogenic fuel, additional systems may be used to convert the fuel from its cryogenic state to a gaseous state. For example, the gaseous fuel source 304 may comprise a cryogenic storage tank. The gaseous fuel can be pumped from the cryogenic storage tank by a cryopump 307 to increase the pressure of the gaseous fuel to a pressure above the pressure in the burner of the gas turbine engine. The gaseous fuel can then pass through ancillary systems 332 (see FIG. 3C), such as a vaporizing heat exchanger 311, which converts the gaseous fuel from a cryogenic state to a gaseous state. The shut off valve 306 can be fully opened or fully closed to enable or prevent, respectively, flow of the gaseous fuel from the gaseous fuel source 304 to the engine fuel nozzles 318. The shut off valve 306 can be controlled by a gaseous fuel shut off valve controller 308, which can be in communication with a mode switch 324. The mode switch 324 can have a first state and the second state. When the mode switch 324 is in the first state, the gas turbine engine runs solely on the liquid fuel from the liquid fuel source 302. When the mode switch 324 is in the second state, the gas turbine engine runs on the liquid fuel from the liquid fuel source 302 and the gaseous fuel from the gaseous fuel source 304 simultaneously. In various embodiments, the mode switch 324 can be a pilot-selectable switch arranged in the cockpit of an aircraft. In various embodiments, the mode switch 324 can be computer-controlled such that the position of the mode switch 324 is automatically selected based on the various flight criteria, discussed in greater detail below. The mode switch 324 could output or trigger a dual fuel indication signal when the mode switch 324 is in the second state. The conduits can be any type of tubing, pipes, or the like for transporting the liquid fuel. The conduits are indicated in FIGS. 3A and 3C by the arrows connecting the gaseous fuel source 304, the engine fuel nozzles 318, and the various components therebetween.

After passing through the shut off valve 306, the gaseous fuel can pass through a gaseous fuel metering valve 310, which can vary between a fully-closed position and a fully-open position (and partially-open positions therebetween). The gaseous fuel metering valve 310 can thereby meter or set the gaseous fuel flow rate to the engine fuel nozzles 318. The gaseous fuel metering valve 310 can be connected to a gaseous fuel metering valve controller 312 that controls the position of the gaseous fuel metering valve 310. In various embodiments, the system 300 may omit the shut off valve 306 and the gaseous fuel shut off valve controller 308, and the gaseous fuel metering valve 310 can serve to cut off the gaseous fuel supply in its fully-closed position.

The liquid fuel metering valve controller 316 and the gaseous fuel metering valve controller 312 can be connected to each other and to various sensors and systems onboard the aircraft to provide adequate liquid fuel flow to support ancillary systems and to provide a total fuel flow that results in the amount of thrust commanded by the aircraft. For example, the liquid fuel metering valve controller 316 can be connected to one or more sensors that indicate conditions of the ancillary systems that use the liquid fuel. For example, as described above, the liquid fuel may pass through an oil/fuel intercooler to cool engine oil. The liquid fuel metering valve controller 316 can be in communication with an engine oil temperature sensor 326, and the liquid fuel metering valve controller 316 can incrementally open or close the liquid fuel metering valve 314 (e.g., by sending a liquid fuel flow signal) to maintain the engine oil temperature (detected by the engine oil temperature sensor 326) below a predetermined limit value (e.g., a maximum oil temperature). As another example, the liquid fuel may provide hydraulic pressure for hydraulically actuated systems on the engine (e.g., actuation of variable stator vanes). The liquid fuel metering valve controller 316 can be in communication with an engine hydraulic pressure sensor 328, and the liquid fuel metering valve controller 316 can incrementally open or close the liquid fuel metering valve 314 to maintain the engine hydraulic pressure (detected by the engine hydraulic pressure sensor 328) above a predetermined limit value (e.g., a minimum engine hydraulic pressure).

The liquid fuel metering valve controller 316 and the gaseous fuel metering valve controller 312 can both be connected to a throttle command input 322 (i.e., throttle control) that can output a throttle command signal. The throttle command input 322 can be a throttle command unit, such as a throttle quadrant on the flight deck, and/or a flight management computer (FMC) in the cockpit of the aircraft. The throttle command signal can indicate a thrust request. As described above, in various embodiments, the system 300 can meter the flow of the liquid fuel and the gaseous fuel so that a minimal amount of liquid fuel is used (e.g., to satisfy various ancillary systems) and gaseous fuel is added to the liquid fuel to satisfy the thrust command of the aircraft. The liquid fuel metering valve controller 316 and the gaseous fuel metering valve controller 312 can also be in communication with a gas turbine speed sensor 320. Engine power output (i.e., thrust) is a function of engine speed. Consequently, receiving an engine speed indication from the gas turbine speed sensor 320 can provide feedback to the liquid fuel metering valve controller 316 and the gaseous fuel metering valve controller 312 for control of gaseous fuel metering valve 310 and liquid fuel metering valve 314, respectively, based on the throttle command input 322.

In various embodiments, the throttle unit and/or FMC can communicate with a full authority digital engine control (FADEC) that schedules fuel flow to the gas turbine engine to meet a thrust command and that operates the engine within limits. The FADEC can use one or more computer processors to compute a fuel flow (i.e., a rate of fuel flow). In such embodiments, the throttle unit and/or FMC is typically in communication with the FADEC via a "fly by wire" system. In various embodiments, the throttle unit and/or FMC can be connected to a hydromechanical fuel control for the gas turbine engine via a mechanical linkage (e.g., a control cable). In such embodiments, the hydromechanical fuel control schedules fuel flow to the gas turbine engine based on the position of the mechanical linkage and various analog signals from the engine. For example, the hydromechanical fuel control may include one or more pressure inputs from various points in the engine, engine speed in revolutions per minute (RPM), or combinations thereof. The hydromechanical fuel control can include an analog computer that schedules fuel flow based on the position of the mechanical linkage and the various pressure inputs, RPM, or the like to provide commanded engine thrust while staying within the limits of the engine. For example, the pressure inputs may include a pressure at the inlet of the compressor for the gas turbine engine and a pressure at the outlet of the compressor. The RPM may be the speed of a fan rotor or the speed of a high-speed rotor in a turbofan engine. A commanded increase in fuel flow (e.g., by the pilots pushing throttle levers forward) may be performed at a slower rate than commanded to avoid a compressor stall, for example. The FADEC and the hydromechanical fuel control can each control a metering valve that controls fuel flow of the liquid fuel to the engine fuel nozzles 318 of the engine.

In various embodiments, the liquid fuel metering valve controller 316 can be installed downstream of the FADEC or hydromechanical fuel control so that the existing engine systems do not have to be changed. Put differently, the FADEC or hydromechanical fuel control can operate as if the liquid fuel is the sole fuel source for the engine. The liquid fuel metering valve controller 316 can then divert or block the liquid fuel that is not needed because the engine is also operating on gaseous fuel. For example, the liquid fuel metering valve 314 can divert a portion of the liquid fuel back to the liquid fuel source 302. As another example, the liquid fuel metering valve 314 can "deadhead" the flow of the liquid fuel from the liquid fuel source 302 to the engine fuel nozzles 318. Put differently, the liquid fuel metering valve 314 can block or restrict flow of the liquid fuel to the engine fuel nozzles 318.

In various instances in which the engine is controlled by a FADEC, the liquid fuel metering valve controller 316 can be incorporated into the FADEC. For example, in some instances, computer code could be added to the FADEC to operate the FADEC-controlled fuel valve in combination with the gaseous fuel metering valve controller 312. In such instances, the liquid fuel metering valve controller 316 can be omitted since the FADEC performs the operations of the liquid fuel metering valve controller 316 and the FADEC-controlled fuel valve operates the liquid fuel metering valve 314. Similarly, in some instances, computer code could be added to the FADEC to operate the gaseous fuel metering valve 310. In such instances, the gaseous fuel metering valve controller 312 could be omitted since the FADEC performs the operations of the gaseous fuel metering valve controller 312.

Figure 4:
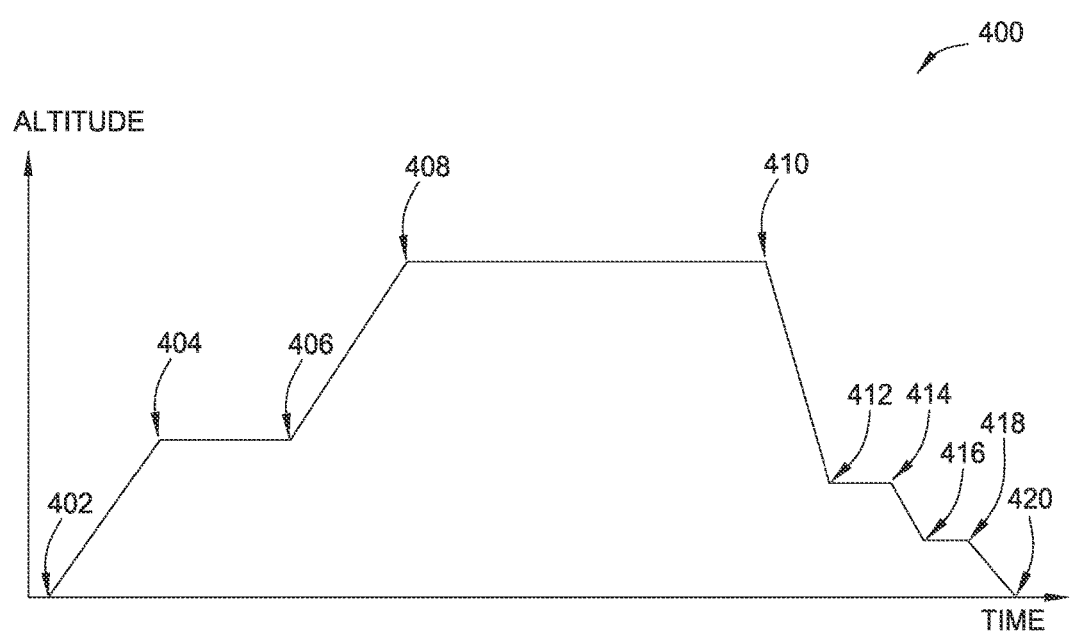
FIG. 4 is a graphical representation of a flight profile.

FIG. 4 illustrates a chart 400 of an exemplary altitude profile for a flight of an aircraft, showing altitude over time for the flight. In this scenario, the aircraft takes off at time 402 and climbs to a first altitude at time 404. The aircraft cruises at the first altitude from time 404 to time 406. The aircraft then climbs again from time 406 to time 408 to a second altitude. The aircraft then cruises at a constant altitude from time 408 to time 410. At times 410, the aircraft begins to descend and includes two steps (between times 412 and 414 and times 416 and 418) during the descent before landing at time 420. Various other altitude profiles are possible. For example, in some instances, air traffic control allows for a continuous climb to cruise altitude without any holds at intermediate altitudes. As another example, the cruise portion may include step climbs as the aircraft burns fuels, becomes lighter, and can fly higher.

The sizing of the components of the gaseous fuel delivery system may affect when the engine may be fed the liquid fuel and the gaseous fuel simultaneously. For example, burner pressure in a gas turbine engine is highest at high power settings. For example, during the take off and climb periods between times 402 and 404 and times 406 and 408, the burner pressure in a gas turbine engine of the aircraft could be high. To overcome such a large burner pressure, the various fuel lines, pumps, and valve that deliver the gaseous fuel from the gaseous fuel source (e.g. gaseous fuel source 304) to the engine fuel nozzles (e.g., engine fuel nozzles 318) would have to be larger and (likely) heavier than if the maximum pressure required was lower. The components of the gaseous fuel delivery system could be smaller if the gaseous fuel system is sized to only operate at lower burner pressures, such as a cruise power setting for the gas turbine engine. Further, for a dual fuel burner to maintain an acceptable combustion pattern factor (i.e., turbine inlet temperature profile during maximum thrust operation), limiting maximum thrust for only liquid fuel operation may allow for easier modification of the burner design (to add the gaseous injectors). Alternatively, a more highly-modified or new engine could use a cryogenic gas as a heat sink for engine internal cooling to allow a high power output design. For the embodiment described above in which the maximum gaseous fuel pressure is limited, the aircraft flying the profile shown in FIG. 4 may only operate in dual fuel mode from times 404 to 406, times 408 to 410, times 412 to 414, and times 416 to 418 when the aircraft is cruising at level flight. In various embodiments, the engines may be able to operate on liquid fuel and gaseous fuel simultaneously during descent periods. However, descents are typically performed at an idle thrust or minimal thrust setting. At such low thrust settings, the amount of liquid fuel required to support ancillary systems, such as oil cooling and hydraulic pressure, may also be sufficient to satisfy the thrust command from the engine such that gaseous fuel would not be introduced.

Figure 5:
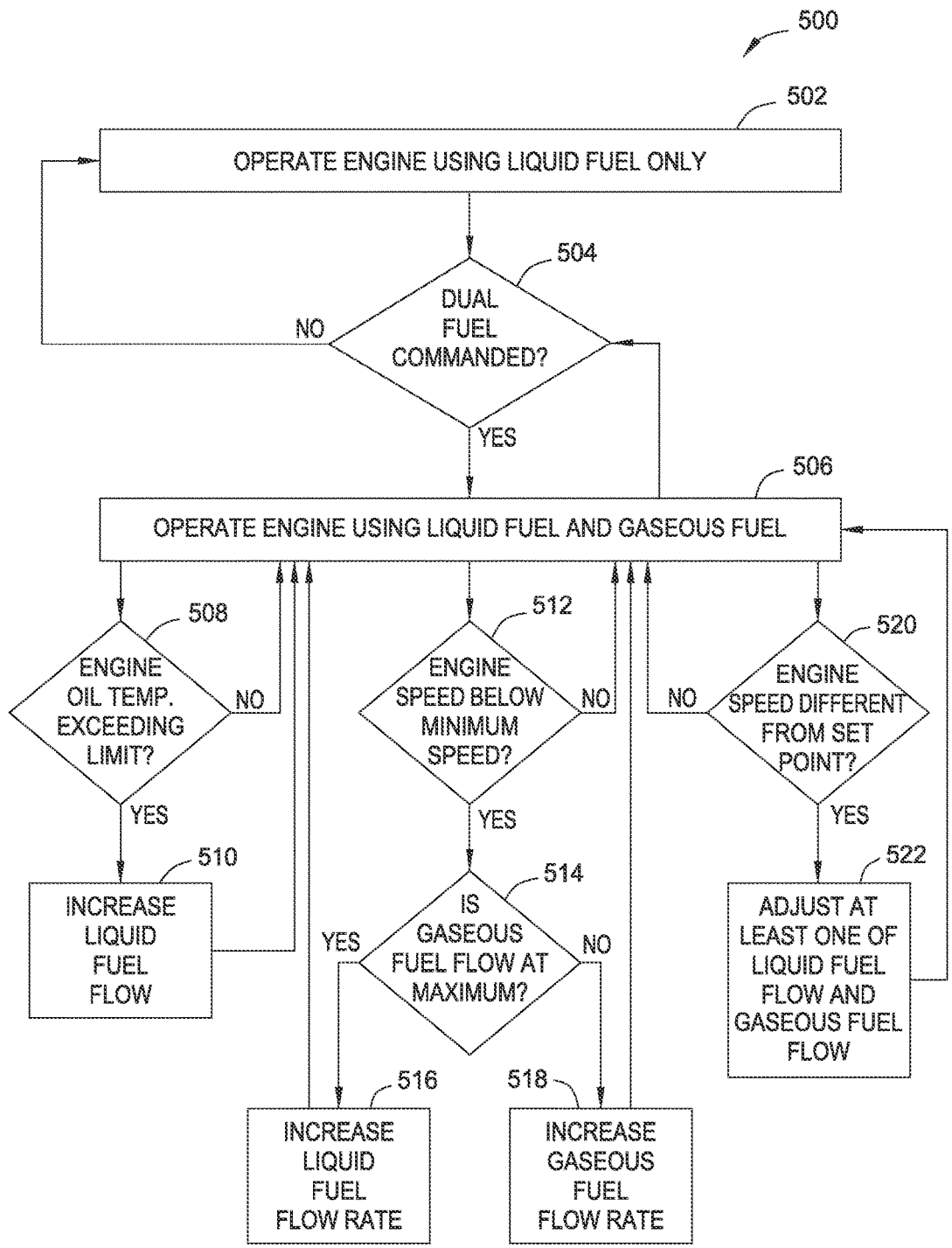
FIG. 5 is a method for operating a gas turbine engine using two fuels simultaneously.

FIG. 5 is a flow chart of a process 500 that a dual fuel system, such as the system 300 shown in FIG. 3, may perform to implement dual fuel operation in a gas turbine engine. In block 502 of the process 500, the gas turbine engine starts operation using liquid fuel only. As discussed above, in various instances, a gaseous fuel system may require a vaporizer and other equipment to convert a cryogenically stored fuel into a gaseous form. Such a vaporizer may require engine heat to operate. In such instances, the engine may need to start using only liquid fuel and run for a period of time using only liquid fuel before gaseous fuel can be introduced. Additionally, in various instances, gaseous fuel may not have satisfactory throttle response qualities. Put differently, use of gaseous fuel when the throttle command is being changed (e.g., when the pilots command take off power) may result in abrupt or unexpected thrust changes. In such instances, gaseous fuel may only be used during relatively steady-state operations, such as cruise flight. In block 504, the system determines whether dual fuel use has been commanded. If dual fuel use has not been commanded, then the process 500 can return to block 502. If dual fuel use has been commanded in block 504, then the process 500 can move to block 506, in which the engine operates using liquid fuel and gaseous fuel. At block 506, the process 500 can simultaneously (or in sequential order) monitor different parameters to ensure safe and proper operation of the engine. The process 500 can continually check to ensure that dual fuel usage has been commanded (as indicated by the arrow referring back to block 504). Also, the process 500 can monitor engine performance criteria and/or ancillary systems criteria to determine proper fuel flow rates of liquid fuel and gaseous fuel. The flowchart illustrated in FIG. 5 shows several exemplary monitoring processes. For example, in block 508, the process 500 can determine whether the engine oil temperature is exceeding a limit. As discussed above with reference to FIG. 3, the liquid fuel metering valve controller 316 can monitor the engine oil temperature from an engine oil temperature sensor 326. In the event the engine oil temperature is exceeding the limit, then in block 510, the liquid fuel flow rate can be increased (e.g., by the liquid fuel metering valve controller). If the engine oil temperature is not exceeding a limit in block 508, then the process 500 can return to block 506. Also, if the engine oil temperature is below the limit, then the liquid fuel flow rate can be decreased.

As another example, in block 512, the process 500 can determine whether the engine speed is below a minimum engine speed. A gas turbine engine must maintain a minimum speed to sustain combustion, assure adequate rapid power up capability, and/or provide sufficient secondary power output (e.g., to an electrical generator, to a pneumatic bleed, and a power takeoff shaft). If the engine speed drops below the minimum speed, then, in block 514, the process 500 can check whether the gaseous fuel flow rate is at a maximum fuel flow rate. If the gaseous fuel flow rate is not at a maximum rate, then, in block 518, the process can increase the gaseous fuel flow rate to increase the engine speed. For example, the gaseous fuel metering valve controller 312 referenced in FIG. 3 can open the gaseous fuel metering valve 310 to increase the gaseous fuel flow rate. Returning to block 514, if the gaseous fuel flow rate is at a maximum, then, in block 516, the process 500 can increase the liquid fuel flow rate. For example, referencing FIG. 3, the liquid fuel metering valve controller 316 could open the liquid fuel metering valve 314 to increase the liquid fuel flow rate until the engine speed is at or above the minimum speed.

As another example, in block 520, the process 500 can determine whether the engine speed is different from a set point speed. As discussed above, the thrust provided by gas turbine engine is a function of engine speed. Generally, the faster the rotation speed of the engine, the more thrust it is providing. If the engine speed is different from a set point speed, then, in block 520, the process 500 can adjust at least one of the liquid fuel flow and gaseous fuel flow to adjust the engine speed. For example, if the engine speed is below a set point speed, then the process 500 may increase the gaseous fuel flow to increase the engine speed. Similarly, if the engine speed is above a set point speed, then the process 500 may decrease the gaseous fuel flow to decrease the engine speed.

As described above the various monitoring processes (e.g. processes in blocks 508, 512, 514, and 520 can operate simultaneously. The various monitoring processes may also operate parametrically, meaning that there could be interrelationships between the different monitoring processes. For example, in block 510, the process 500 may increase the liquid fuel flow rate to satisfy the engine oil temperature exceeding a limit. However, such an increase in liquid fuel flow rate may cause the engine speed to deviate from the set point speed (block 520). In such instances, the increase in liquid fuel flow in block 510 could require a commensurate decrease in gaseous fuel flow in block 522 to maintain the engine speed at the set point speed in block 522.

In the embodiments described above, aircraft gas turbine engines can operate on two fuels simultaneously. The two fuels can be used at any ratio that satisfies the requirements of ancillary systems and thrust requirements. For example, in various instances, the ratio of gaseous fuel to liquid fuel may be 90% to 80%. In various other instances, the ratio of gaseous fuel to liquid fuel may be 80% to 70%. In various other instances, the ratio of gaseous fuel to liquid fuel may be 70% to 60%. In various other instances, the ratio of gaseous fuel to liquid fuel may be 60% to 50%. In various other instances, the ratio of gaseous fuel to liquid fuel may be 50% to 40%. In various other instances, the ratio of gaseous fuel to liquid fuel may be 40% to 30%. In various other instances, the ratio of gaseous fuel to liquid fuel may be 30% to 20%. In various other instances, the ratio of gaseous fuel to liquid fuel may be 20% to 10%. In various other instances, the ratio of gaseous fuel to liquid fuel may be above 90%. In various other instances, the ratio of gaseous fuel to liquid fuel may be below 10%.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. An aircraft comprising:
   a first fuel storage container configured to store a liquid fuel;
   a second fuel storage container configured to store a gaseous fuel;
   a gas turbine engine that includes fuel nozzles configured to inject the liquid fuel and the gaseous fuel into a burner of the gas turbine engine;
   a controller configured to:
      simultaneously meter a flow of the liquid fuel and a flow of the gaseous fuel to the fuel nozzles from the first fuel storage container and the second fuel storage container, respectively, to satisfy an operating limit of the gas turbine engine, wherein satisfying the operating limit comprises monitoring an engine oil temperature with an engine oil sensor, and in response to the engine oil temperature exceeding a predetermined value, increasing a ratio of the flow of the liquid fuel to the flow of the gaseous fuel by increasing the flow of the liquid fuel; and
   a selectable switch in communication with the controller, wherein the controller does not permit the flow of the gaseous fuel when the selectable switch is in a first state, wherein the controller permits the flow of the gaseous fuel and the flow of liquid fuel when the selectable switch is in a second state, and wherein the selectable switch automatically switches to the second state when the aircraft is configured for cruise flight.

2. The aircraft of claim 1, further comprising a throttle control in communication with the controller, wherein the throttle control provides a thrust request, wherein the controller is configured to meter the flow of the gaseous fuel to satisfy the thrust request.

3. The aircraft of claim 1, wherein the second fuel storage container comprises a cryogenic storage tank.

4. The aircraft of claim 3, wherein the cryogenic storage tank comprises a conformal tank arranged on an exterior surface of the aircraft.

5. The aircraft of claim 3, wherein the cryogenic storage tank comprises a tank arranged in an interior space of the aircraft.

6. A system comprising:
   a liquid fuel metering valve operably coupled to a first actuator;
   a gaseous fuel metering valve operably coupled to a second actuator; and
   a fuel flow controller, comprising:
      a first input configured to receive a throttle command signal;
      a second input configured to receive a dual fuel indication signal;
      a third input configured to receive an engine oil temperature signal from a gas turbine engine;
      a fourth input operable to receive an engine hydraulic pressure signal from a hydraulically-actuated system for the gas turbine engine;
      a first output configured to output a liquid fuel flow signal to the liquid fuel metering valve;
      a second output configured to output a gaseous fuel flow signal to the gaseous fuel metering valve; and
      computer logic configured to achieve a concurrent flow of a gaseous fuel flow and flow of a liquid fuel flow to a fuel nozzle of the gas turbine engine by:
         outputting the liquid fuel flow signal based on at least the throttle command, the engine oil temperature signal, and the engine hydraulic pressure signal; and
         outputting the gaseous fuel flow signal based on at least the received dual fuel indication signal and the throttle command,
         wherein the computer logic is configured to increase a ratio of the liquid fuel flow signal to the gaseous fuel flow signal by increasing the flow of the liquid flow in response to the engine oil temperature reaching a first predetermined limit;
         wherein the first actuator actuates the liquid fuel metering valve to adjust a position of the liquid fuel metering valve in response to the liquid fuel flow signal; and
         wherein the second actuator actuates the gaseous fuel metering valve to adjust a position of the gaseous fuel metering valve in response to the gaseous fuel flow signal.

7. The system of claim 6, wherein the throttle command signal comprises a thrust request.

8. The system of claim 6, wherein the liquid fuel flow signal maintains a second engine parameter associated with the engine hydraulic pressure signal within a second predetermined limit, and wherein the gaseous fuel flow signal comprises a gaseous fuel flow signal that satisfies the throttle command signal.

9. The system of claim 6, wherein:
   the liquid fuel metering valve is operably coupled to the first actuator, wherein the liquid fuel metering valve is configured to be arranged in a liquid fuel conduit between a hydromechanical fuel control of the engine and a fuel nozzle of the gas turbine engine.

10. The system of claim 6, wherein:
    a fuel storage container is configured to store a gaseous fuel;
    the second actuator is connected to the second output; and
    wherein the gaseous fuel metering valve is configured to be arranged in a gaseous fuel conduit between the fuel storage container and a fuel nozzle of the gas turbine engine.

11. A method for operating a gas turbine engine using a liquid fuel and a gaseous fuel simultaneously, the method comprising:

measuring at least one measured engine parameter that depends on a fuel flow of the liquid fuel, wherein the at least one measured engine parameter comprises an engine oil temperature;

receiving an engine thrust request;

metering a fuel flow of the liquid fuel to a fuel nozzle of the gas turbine engine to satisfy a predetermined constraint on the at least one measured engine parameter, wherein the predetermined constraint comprises a maximum oil temperature, and wherein metering the fuel flow of the liquid fuel comprises increasing a ratio of the fuel flow of the liquid fuel to a fuel flow of a gaseous fuel by increasing the fuel flow of the liquid fuel to maintain the engine oil temperature below the maximum oil temperature; and simultaneously adjusting the ratio of the fuel flow of the liquid fuel to the fuel flow of the gaseous fuel to the fuel nozzle to satisfy the received engine thrust request.

12. The method of claim 11, wherein measuring the at least one measured engine parameter further comprises measuring an engine hydraulic pressure, wherein the predetermined constraint on the at least one measured engine parameter is a minimum engine hydraulic pressure, and wherein metering the fuel flow of the liquid fuel comprises metering the fuel flow of the liquid fuel to maintain the engine hydraulic pressure above the minimum engine hydraulic pressure.

13. The method of claim 11, wherein measuring the at least one measured engine parameter further comprises measuring an engine speed, wherein the predetermined constraint on the measured engine parameter is a minimum engine speed, and wherein metering the fuel flow of the liquid fuel comprises metering the fuel flow of the liquid fuel to maintain the engine speed above the minimum engine speed.

14. The method of claim 11, further comprising increasing the fuel flow of the liquid fuel upon the fuel flow of the gaseous fuel reaching a maximum fuel flow and the gas turbine engine not achieving the engine thrust request.

15. The method of claim 11, wherein the flow of the liquid fuel and the flow of the gaseous fuel define a total fuel flow, wherein metering the fuel flow of the liquid fuel comprises metering the fuel flow of the liquid fuel to 10% of the total fuel flow, and wherein metering the fuel flow of the gaseous fuel comprises metering the fuel flow of the gaseous fuel to 90% of the total fuel flow.

16. The system of claim 6, wherein the hydraulically-actuated system for the engine comprises a stator vane actuator.

17. An aircraft, comprising:

a first fuel storage container configured to store a liquid fuel;

a second fuel storage container configured to store a gaseous fuel;

a gas turbine engine that includes fuel nozzles configured to inject the liquid fuel and the gaseous fuel into a burner of the gas turbine engine;

a controller configured to;

simultaneously meter a flow of the liquid fuel and a flow of the gaseous fuel to the fuel nozzles from the first fuel storage container and the second fuel storage container, respectively, to satisfy an operating limit of the gas turbine engine, wherein satisfying the operating limit comprises monitoring an engine oil temperature with an engine oil sensor, and in response to the engine oil temperature exceeding a predetermined value, increasing a ratio of the flow of the liquid fuel to the flow of the gaseous fuel by increasing the flow of the liquid fuel.

* * * * *